United States Patent
Yamada et al.

(10) Patent No.: US 12,212,004 B2
(45) Date of Patent: Jan. 28, 2025

(54) BINDER, SLURRY FOR SOLID-STATE BATTERY, ELECTRODE FOR SOLID-STATE BATTERY, AND SECONDARY SOLID-STATE BATTERY

(71) Applicant: DAIKIN INDUSTRIES, LTD., Osaka (JP)

(72) Inventors: Takaya Yamada, Osaka (JP); Junpei Terada, Osaka (JP); Takahiro Furutani, Osaka (JP); Kae Fujiwara, Osaka (JP); Akinori Tani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 552 days.

(21) Appl. No.: 17/629,012

(22) PCT Filed: Jul. 22, 2020

(86) PCT No.: PCT/JP2020/028405
§ 371 (c)(1),
(2) Date: Jan. 21, 2022

(87) PCT Pub. No.: WO2021/015230
PCT Pub. Date: Jan. 28, 2021

(65) Prior Publication Data
US 2022/0271293 A1 Aug. 25, 2022

(30) Foreign Application Priority Data
Jul. 25, 2019 (JP) .................. 2019-136621

(51) Int. Cl.
| | |
|---|---|
| *H01M 4/00* | (2006.01) |
| *C08F 214/20* | (2006.01) |
| *H01M 4/38* | (2006.01) |
| *H01M 4/587* | (2010.01) |
| *H01M 4/62* | (2006.01) |
| *H01M 10/0525* | (2010.01) |
| *H01M 10/0562* | (2010.01) |

(Continued)

(52) U.S. Cl.
CPC .......... *H01M 4/623* (2013.01); *C08F 214/20* (2013.01); *H01M 4/386* (2013.01); *H01M 4/587* (2013.01);
(Continued)

(58) Field of Classification Search
CPC ............... H01M 4/62; H01M 10/0562; H01M 10/0525; H01M 4/587; H01M 4/38; H01M 10/0585; C08F 214/20
See application file for complete search history.

(56) References Cited

U.S. PATENT DOCUMENTS

| | | | |
|---|---|---|---|
| 2013/0264522 A1 | 10/2013 | Stanga et al. | |
| 2014/0162139 A1* | 6/2014 | Hoshiba | H01M 4/622 429/217 |

(Continued)

FOREIGN PATENT DOCUMENTS

| | | |
|---|---|---|
| CN | 104205441 A | 12/2014 |
| EP | 4 006 066 A1 | 6/2022 |

(Continued)

OTHER PUBLICATIONS

Extended European Search Report dated Sep. 29, 2023 in corresponding European Application No. 20844460.4.
(Continued)

*Primary Examiner* — Anca Eoff
*Assistant Examiner* — Monique M Wills
(74) *Attorney, Agent, or Firm* — Sughrue Mion, PLLC

(57) ABSTRACT

A binder and a slurry suitable for use in the production of an electrode in a sulfide-based solid-state battery. The binder contains sulfide-based solid electrolyte particles, and is a fluorine-containing elastomer in which resin end functional groups satisfy:

$0.01 \leq ([-CH_2OH] + [-COOH])/([-CH_3] + [-CF_2H] + [-CH_2OH] + [-CH_2I] + [-OC(O)RH] + [-COOH]) \leq 0.25$ (Continued)

where R represents an alkyl group with 1 to 20 carbon atoms. Also disclosed is an electrode including an electrode active material layer formed using the slurry and a lithium-ion secondary solid state battery including the electrode.

17 Claims, 1 Drawing Sheet

(51) Int. Cl.
 *H01M 10/0585* (2010.01)
 *H01M 4/02* (2006.01)
(52) U.S. Cl.
 CPC ... *H01M 10/0525* (2013.01); *H01M 10/0562* (2013.01); *H01M 10/0585* (2013.01); *C08F 2800/10* (2013.01); *H01M 2004/027* (2013.01); *H01M 2300/0068* (2013.01)

(56) References Cited

U.S. PATENT DOCUMENTS

| 2014/0363715 A1 | 12/2014 | Toyoda et al. |
|---|---|---|
| 2016/0028107 A1 | 1/2016 | Kubo et al. |
| 2016/0028108 A1 | 1/2016 | Hashimoto et al. |

FOREIGN PATENT DOCUMENTS

| JP | 2012-204114 A | 10/2012 |
|---|---|---|
| JP | 2014-007138 A | 1/2014 |
| JP | 2014-502650 A | 2/2014 |
| JP | 2015-156385 A | 8/2015 |
| JP | 2015-185410 A | 10/2015 |
| JP | 2016-025025 A | 2/2016 |
| JP | 2016-025027 A | 2/2016 |
| WO | 2013/147077 A1 | 10/2013 |
| WO | 2013/179120 A1 | 12/2013 |

OTHER PUBLICATIONS

Communication dated Feb. 15, 2022 from the Taiwanese Patent Office in Application No. 109124840.
International Search Report of PCT/JP2020/028405 dated Oct. 27, 2020 [PCT/ISA/210].
International Preliminary Report on Patentability with a translation of the Written Opinion dated Jan. 25, 2022 from the International Bureau in International Application No. PCT/JP2020/028405.

* cited by examiner

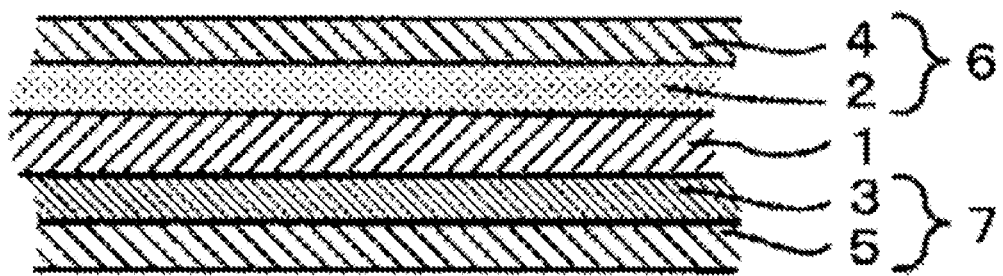

BINDER, SLURRY FOR SOLID-STATE BATTERY, ELECTRODE FOR SOLID-STATE BATTERY, AND SECONDARY SOLID-STATE BATTERY

CROSS REFERENCE TO RELATED APPLICATIONS

This application is a National Stage of International Application No. PCT/JP2020/028405, filed Jul. 22, 2020, claiming priority to Japanese Patent Application No. 2019-136621, filed Jul. 25, 2019.

TECHNICAL FIELD

The present disclosure relates to a binder, a slurry for a solid-state battery, an electrode for a solid-state battery, and a secondary solid-state battery.

BACKGROUND ART

Solid-state batteries have been studied as highly safe batteries. Known solid conductors used in solid-state batteries are classified as sulfide- and oxide-based, and solid-state batteries formed using these solid conductors have been studied. Of these batteries, for a sulfide-based solid-state battery, an electrode is produced by preparing a slurry containing an electrolyte and a binder, and applying and drying the slurry.

Patent Literature 1 discloses a method for producing a positive electrode for a solid-state battery, which uses butyl butyrate as a solvent, and uses a copolymer of vinylidene fluoride and hexafluoropropylene as a binder.

Patent Literature 2 discloses a method for producing a negative electrode for a solid-state battery, which uses butyl butyrate as a solvent, and uses a copolymer of vinylidene fluoride and hexafluoropropylene as a binder.

Patent Literature 3 discloses a slurry for a positive electrode for a sulfide-based solid-state battery, comprising a fluoropolymer containing a vinylidene fluoride monomer component.

Patent Literature 4 discloses a slurry for a sulfide-based electrode, comprising a fluoropolymer containing a vinylidene fluoride monomer component, and a nitrile solvent.

CITATION LIST

Patent Literature

Patent Literature 1: Japanese Patent Laid-Open No. 2016-25027
Patent Literature 2: Japanese Patent Laid-Open No. 2016-25025
Patent Literature 3: Japanese Patent Laid-Open No. 2014-07138
Patent Literature 4: Japanese Patent Laid-Open No. 2012-204114

SUMMARY OF INVENTION

Technical Problem

The present disclosure aims to provide a binder and a slurry suitable for use in the production of an electrode in a sulfide-based solid-state battery.

Solution to Problem

The present disclosure provides a binder used in a slurry for a solid-state battery comprising sulfide-based solid electrolyte particles,
the binder being a fluorine-containing elastomer in which resin end functional groups satisfy:

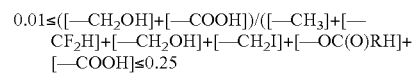

wherein R represents an alkyl group with 1 to 20 carbon atoms.

Preferably, the fluorine-containing elastomer contains a vinylidene fluoride (VdF) monomer unit and a copolymerization unit.

Preferably, the copolymerization unit in the fluorine-containing elastomer is at least one copolymerization unit selected from the group consisting of hexafluoropropylene (HFP), 2,3,3,3-tetrafluoropropylene, 1,3,3,3-tetrafluoropropylene, a perfluoroalkyl vinyl ether (PAVE), and tetrafluoroethylene (TFE).

Preferably, the copolymerization unit in the fluorine-containing elastomer is at least partially hexafluoropropylene (HFP), a perfluoroalkyl vinyl ether (PAVE), tetrafluoroethylene (TFE). Preferably, the fluorine-containing elastomer- has a fluorine content of 60 to 71% by mass.

Preferably, the fluorine-containing elastomer has a glass transition temperature of 25° C. or less.

Preferably, the fluorine-containing elastomer is amorphous.

Preferably, the present disclosure provides a slurry for a solid-state battery comprising sulfide-based solid electrolyte particles, a binder, and a solvent,
wherein the binder is any of the binders described above.

Preferably, the solvent is a low-polarity solvent.

Preferably, the solvent contains at least one compound selected from the group consisting of aromatic compounds and ester compounds.

Preferably, the slurry for a solid-state battery further comprises active material particles.

Preferably, the active material particles are a negative electrode active material.

The present disclosure also provides an electrode for a solid-state battery comprising an electrode active material layer formed using the slurry containing the active material particles, and a current collector.

Preferably, the electrode for a solid-state battery is a negative electrode.

Preferably, the electrode active material at least partially contains a carbonaceous material.

Preferably, the electrode active material at least partially contains a silicon-containing compound.

The present disclosure also provides a lithium-ion secondary solid-state battery comprising the electrode for a solid-state battery described above.

Advantageous Effects of Invention

The binder of the present disclosure has excellent solubility in a low-polarity solvent, as well as excellent performance in terms of adhesion and flexibility, and thus, is suitable for use in the production of an electrode in a sulfide-based solid-state battery.

BRIEF DESCRIPTION OF DRAWING

FIG. 1 is a diagram showing one exemplary laminated structure of a sulfide-based solid-state battery of the present disclosure.

DESCRIPTION OF EMBODIMENTS

The present disclosure will be hereinafter described in detail.

The present disclosure provides a binder used mainly for forming an electrode for a solid-state battery.

A known method for forming an electrode for a sulfide-based solid-state battery includes applying and drying a slurry containing sulfide-based solid electrolyte particles, a binder, and a solvent, and then pressing an electrode layer formed from the slurry. To form a satisfactory electrode using this method, the selection of the binder and the solvent to be used in combination with the sulfide-based solid electrolyte particles is important. In particular, when the sulfide-based solid electrolyte particles are used, it is necessary to select a solvent that does not react with the sulfide-based solid electrolyte particles, which limits the types of solvents that can be used. Moreover, to prepare a slurry using such a solvent, it is necessary to select a binder that dissolves in the solvent.

Thus, it is desirable to use a binder having suitable solubility in the solvent. However, known binders often have low solubility in the solvent. Therefore, such binders cannot be sufficiently dissolved in the slurry containing the sulfide-based solid electrolyte particles, and thus, cannot sufficiently function as binders. According to the present disclosure, a binder with satisfactory dissolution performance can be obtained by using the polymer having specific composition described above. As a result, a satisfactory slurry suitable for the production of the battery can be obtained.

In the present disclosure, a fluorine-containing elastomer is used in which resin end functional groups satisfy:

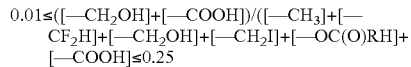

wherein R represents an alkyl group with 1 to 20 carbon atoms.

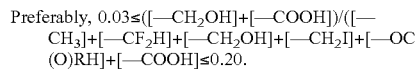

The polymer has excellent performance such as heat resistance, flexibility, and is also excellent in the point of high solubility in a low-polarity solvent. This also provides the advantage of obtaining a slurry which does not react with the sulfide-based solid electrolyte particles. Moreover, the variety of solvents available is expanded, which allows uses of suitable solvents according to different purposes. In particular, the amount of resin end functional groups satisfying the above is particularly preferable so as to achieve satisfactory flexibility.

The polymer of the present disclosure is a fluorine-containing elastomer. The fluorine-containing elastomer is a fluoropolymer that is amorphous or low-crystalline, and has a low glass transition temperature.

Preferably, the fluorine-containing elastomer has a glass transition temperature of 25° C. or less. More preferably, the glass transition temperature is 0° C. or less. The glass transition temperature is still more preferably −5° C. or less, and most preferably −10° C. or less. The glass transition temperature may even be −20° C. or less. As used herein, the glass transition temperature is determined as follows: using a differential scanning calorimeter (X-DSC823e; Hitachi Technoscience Corporation), a DSC curve is obtained by cooling to −75° C., and then heating 10 mg of a sample at 20° C./min, and determining, as the glass transition temperature, the temperature at the intersection of the extended baseline around the second transition of the DSC curve and the tangent at the inflection point of the DSC curve.

The fluorine-containing elastomer fluorine-containing elastomer is preferably amorphous. Amorphous means that there is no melting point peak in the DSC curve described above.

The fluorine-containing elastomer that is amorphous and has such a low Tg, which dissolves easily in a solvent, is particularly preferable in terms of giving flexibility and ease of processing to the electrode, when used as a binder.

The polymer preferably has an end structure that satisfies the following inequality: 0.01≤([—CH$_2$OH]+[—COOH])/ ([—CH$_3$]+[—CF$_2$H]+[—CH$_2$OH]+[—CH$_2$I]+[—OC(O) RH]+[—COOH])≤0.25 wherein R represents an alkyl group with 1 to 20 carbon atoms.

When the end functional groups satisfy the formula described above, an excellent function as a binder in terms of satisfactory adhesion is achieved.

Specifically, [—CH$_2$OH] and [—COOH] have a functional group having high affinity such as a hydroxyl group and a carboxyl group. Therefore, a resin with these groups has excellent solubility in a hydrophilic solvent used to prepare the slurry. If the amount of such functional groups is excessively large or small, the resin will have low flexibility and thus, cannot have sufficient physical properties required for a binder. It is preferable that the polymer contain these functional groups in a certain proportion or higher, because the polymer then serves as a binder with excellent adhesion. From this viewpoint, the amount of [—CH$_2$OH] and [—COOH] preferably falls in the above-described range.

Satisfying the formula above does not mean that all of the functional groups [—CH$_3$], [—CF$_2$H], [—CH$_2$OH], [—CH$_2$I], [—OC(O)RH], and [—COOH] are included in the ends of the resin, but means that the ratio of the numbers of the present end groups among them falls in the above-described range.

The amount of each end group present in the resin can be determined by NMR analysis. The method for controlling the amount of [—CH$_2$OH] and [—COOH] in the predetermined range described above is not limited, and known methods (for example, the selection and the amount of the initiator to be used) may be used.

Analysis of the end groups by NMR is conducted by measurement using the proton solution NMR method. An analytical sample is prepared as a 20 wt % solution in acetone-d6 as a solvent, and the measurement is conducted.

The reference peak is the peak top of acetone at 2.05 ppm.
Measurement apparatus: VNMRS400; Varian Inc.
Resonance frequency: 399.74 (Sfrq)
Pulse width: 45°
Each end group is associated with each of the following peak positions:
[—CH$_3$]: 1.72-1.86 ppm
[—CF$_2$H]: 6.1-6.8 ppm
[—CH$_2$OH]: 3.74-3.80 ppm
[—CH$_2$I]: 3.87-3.92 ppm

[—OC(O)RH]: 1.09-1.16 ppm

[—COOH]: 10-15 ppm

The amount of each of the functional groups is calculated from the peak intensity based on the integrated value of the peak identified by the measurement described above, and the ratio of the numbers of the functional groups is calculated based on the results, using the following formula:

([—CH$_2$OH]+[—COOH])/([—CH$_3$]+[—CF$_2$H]+[—CH$_2$OH]+[—CH$_2$I]+[—OC(O)RH]+[—COOH])

The amount of the end groups in the fluorine-containing elastomer can be controlled using any known general methods. Specifically, the amount of the end groups can be controlled in the predetermined range described above, by adjusting the selection of the type of the initiator and the amount to be used, the selection of the chain transfer agent and the amount to be used, and the like.

The fluorine-containing elastomer of the present disclosure is not limited in composition as long as it has the above-described amounts of end groups, and may be any polymer containing fluorine.

The fluorine-containing elastomer of the present disclosure may be other than a polymer having a vinylidene fluoride unit, and at least one copolymerization unit (A) selected from the group consisting of a monomer unit having a structure represented by formula (1) below and a monomer unit having a structure represented by formula (2) below:

[Formula 1]

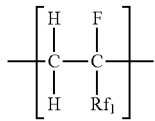
(1)

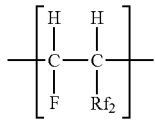
(2)

wherein Rf$_1$ and Rf$_2$ are each a linear or branched fluorinated alkyl or fluorinated alkoxy group with 1 to 12 carbon atoms, which optionally contains an oxygen atom between carbon-carbon atoms when the number of carbon atoms is 2 or more.

Specific examples of the fluorine-containing elastomer include a vinylidene fluoride (VdF)-based fluorine-containing elastomer, a TFE/propylene (Pr)-based fluorine-containing elastomer, a TFE/Pr/VdF-based fluorine-containing elastomer, an ethylene (Et)/HFP-based fluorine-containing elastomer, an Et/HFP/VdF-based fluorine-containing elastomer, an Et/HFP/TFE-based fluorine-containing elastomer, a fluorosilicone-based fluorine-containing elastomer, and a fluorophosphazene-based fluorine-containing elastomer. These fluorine-containing elastomer may be used alone or in any combination, as long as they do not interfere with the effects of the present disclosure. Of these, a VdF-based fluorine-containing elastomer is preferably used.

The VdF-based fluorine-containing elastomer is a fluorine-containing elastomer having a VdF repeating unit. In the VdF-based fluorine-containing elastomer, the content of the VdF repeating unit is preferably 20 mol % or more and 90 mol % or less, and more preferably 40 mol % or more and 85 mol % or less, based on the total number of moles of the VdF repeating unit and a repeating unit derived from another comonomer. The lower limit is still more preferably 45 mol %, and particularly preferably 50 mol %. The upper limit is still more preferably 80 mol %.

The comonomer in the VdF-based elastomer is not limited as long as it is copolymerizable with VdF, and examples include monomers containing fluorine such as tetrafluoroethylene (TFE), hexafluoropropylene (HFP), a perfluoroalkyl vinyl ether (PAVE), chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, an iodine-containing vinyl fluoride ether, a fluorine-containing monomer represented by formula (1-1)

$$CH_2=CFRf_1 \qquad (1\text{-}1)$$

wherein Rf$_1$ is a linear or branched fluorinated alkyl or fluorinated alkoxy group with 1 to 12 carbon atoms, which optionally contains an oxygen atom between carbon-carbon atoms when the number of carbon atoms is 2 or more; a fluorine-containing monomer represented by formula (2-1):

$$CHF=CHRf_2 \qquad (2\text{-}1)$$

wherein Rf$_2$ is a linear or branched fluorinated alkyl or fluorinated alkoxy group with 1 to 12 carbon atoms, which optionally contains an oxygen atom between carbon-carbon atoms when the number of carbon atoms is 2 or more; monomers not containing fluorine such as ethylene (Et), propylene (Pr), and an alkyl vinyl ether, a monomer that provides crosslinkable groups (cure sites), and a reactive emulsifier. One, or a combination of two or more of these monomers and compounds may be used.

In the compound represented by formula (1-1) above, Rf$_1$ is a linear or branched fluorinated alkyl group with 1 to 12 carbon atoms or a linear or branched fluorinated alkoxy group with 1 to 12 carbon atoms. The fluorinated alkyl group and the fluorinated alkoxy group may each contain an oxygen atom (—O—) between carbon-carbon atoms when the number of carbon atoms is 2 or more.

The fluorinated alkyl group of Rf$_1$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of Rf$_1$, a hydrogen atom may be substituted with a substituent other than a fluorine atom; however, the fluorinated alkyl group of Rf$_1$ preferably does not contain a substituent other than a fluorine atom.

Alternatively, the fluorinated alkoxy group of Rf$_1$ may be a partially fluorinated alkoxy group in which a portion of the hydrogen atoms attached to the carbon atom are substituted with fluorine atoms, or may be a perfluorinated alkoxy group in which all of the hydrogen atoms attached to the carbon atom are substituted with fluorine atoms. In the fluorinated alkoxy group of Rf$_1$, a hydrogen atom may be substituted with a substituent other than a fluorine atom; however, the fluorinated alkoxy group of Rf$_1$ preferably does not contain a substituent other than a fluorine atom.

The number of carbon atoms in Rf$_1$ is preferably 1 to 10, more preferably 1 to 6, still more preferably 1 to 4, and particularly preferably 1.

Rf$_1$ is preferably a group represented by the formula:

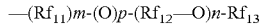
—(Rf$_{11}$)$m$-(O)$p$-(Rf$_{12}$—O)$n$-Rf$_{13}$ wherein Rf$_{11}$ and Rf$_{12}$ are each independently a linear or branched fluorinated alkylene group with 1 to 4 carbon atoms; Rf$_{13}$ is a linear or branched fluorinated alkyl group with 1 to 4 carbon atoms; p is 0 or 1; m is an integer from 0 to 4; and n is an integer from 0 to 4.

The fluorinated alkylene group of $Rf_{11}$ and $Rf_{12}$ may be a partially fluorinated alkylene group in which a portion of the hydrogen atoms attached to the carbon atom are substituted with fluorine atoms, or may be a perfluorinated alkylene group in which all of the hydrogen atoms attached to the carbon atom are substituted with fluorine atoms. In the fluorinated alkylene group of $Rf_{11}$ and $Rf_{12}$, a hydrogen atom may be substituted with a substituent other than a fluorine atom; however, the fluorinated alkylene group of $Rf_{11}$ and $Rf_{12}$ preferably does not contain a substituent other than a fluorine atom. $Rf_{11}$ and $Rf_{12}$ may each be the same or different in each occurrence.

Examples of the fluorinated alkylene group of $Rf_{11}$ include —CHF—, —CF$_2$—, —CH$_2$—CF$_2$—, —CHF—CF$_2$—, —CF$_2$—CF$_2$—, —CF(CF$_3$)—, —CH$_2$—CF$_2$—CF$_2$—, —CHF—CF$_2$—CF$_2$—, —CF$_2$—CF$_2$—CF$_2$—, —CF(CF$_3$)—CF$_2$—, —CF$_2$—CF(CF$_3$)—, —C(CF$_3$)$_2$—, —CH$_2$—CF$_2$—CF$_2$—CF$_2$—, —CHF—CF$_2$—CF$_2$—CF$_2$—, —CF$_2$—CF$_2$—CF$_2$—CF$_2$—, —CH(CF$_3$)—CF$_2$—CF$_2$—, —CF(CF$_3$)—CF$_2$—CF$_2$—, and —C(CF$_3$)$_2$—CF$_2$—. Of these, a perfluorinated alkylene group with 1 or 2 carbon atoms is preferable, with —CF$_2$— being more preferable.

Examples of the fluorinated alkylene group of $Rf_{12}$ include —CHF—, —CF$_2$—, —CH$_2$—CF$_2$—, —CHF—CF$_2$—, —CF$_2$—CF$_2$—, —CF(CF$_3$)—, —CH$_2$—CF$_2$—CF$_2$—, —CHF—CF$_2$—CF$_2$—, —CF$_2$—CF$_2$—CF$_2$—, —CF(CF$_3$)—CF$_2$—, —CF$_2$—CF(CF$_3$)—, —C(CF$_3$)$_2$—, —CH$_2$—CF$_2$—CF$_2$—CF$_2$—, —CHF—CF$_2$—CF$_2$—CF$_2$—, —CF$_2$—CF$_2$—CF$_2$—CF$_2$—, —CH(CF$_3$)—CF$_2$—CF$_2$—, —CF(CF$_3$)—CF$_2$—CF$_2$—, and —C(CF$_3$)$_2$—CF$_2$—. Of these, a perfluorinated alkylene group with 1 to 3 carbon atoms is preferable, with —CF$_2$—, —CF$_2$CF$_2$—, —CF$_2$—CF$_2$—CF$_2$—, —CF(CF$_3$)—CF$_2$—, or —CF$_2$—CF(CF$_3$)— being more preferable.

The fluorinated alkyl group of $Rf_{13}$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_{13}$, a hydrogen atom may be substituted with a substituent other than a fluorine atom; however, the fluorinated alkyl group of $Rf_{13}$ preferably does not contain a substituent (for example, —CN, —CH$_2$I, or —CH$_2$Br) other than a fluorine atom.

Examples of the fluorinated alkyl group of $Rf_{13}$ include —CH$_2$F, —CHF$_2$, —CF$_3$, —CH$_2$—CH$_2$F, —CH$_2$—CHF$_2$, —CH$_2$—CF$_3$, —CHF—CH$_2$F, —CHF—CHF$_2$, —CHF—CF$_3$, —CF$_2$—CH$_2$F, —CF$_2$—CHF$_2$, —CF$_2$—CF$_3$, —CH$_2$—CF$_2$—CH$_2$F, —CHF—CF$_2$—CH$_2$F, —CF$_2$—CF$_2$—CH$_2$F, —CF(CF$_3$)—CH$_2$F, —CH$_2$—CF$_2$—CHF$_2$, —CHF—CF$_2$—CHF$_2$, —CF$_2$—CF$_2$—CHF$_2$, —CF(CF$_3$)—CHF$_2$, —CH$_2$—CF$_2$—CF$_3$, —CHF—CF$_2$—CF$_3$, —CF$_2$—CF$_2$—CF$_3$, —CF(CF$_3$)—CF$_3$, —CH$_2$—CF$_2$—CF$_2$—CF$_3$, —CHF—CF$_2$—CF$_2$—CF$_3$, —CF$_2$—CF$_2$—CF$_2$—CF$_3$, —CH(CF$_3$)—CF$_2$—CF$_3$, —CF(CF$_3$)—CF$_2$—CF$_3$, and —C(CF$_3$)$_2$—CF$_3$. Of these, —CF$_3$, —CHF—CF$_3$, —CF$_2$—CHF$_2$, —CF$_2$—CF$_3$, —CF$_2$—CF$_2$—CF$_3$, —CF(CF$_3$)—CF$_3$, —CF$_2$—CF$_2$—CF$_2$—CF$_3$, —CH(CF$_3$)—CF$_2$—CF$_3$, or —CF(CF$_3$)—CF$_2$—CF$_3$ is preferable.

p is preferably 0.

m is preferably an integer from 0 to 2, more preferably 0 or 1, and still more preferably 0. When p is 0, m is preferably also 0.

n is preferably an integer from 0 to 2, more preferably 0 or 1, and still more preferably 0.

The repeating unit is preferably
—CH$_2$—CF[—CF$_3$]—,
—CH$_2$—CF[—CF$_2$CF$_3$]—,
—CH$_2$—CF[—CF$_2$CF$_2$CF$_3$]—,
—CH$_2$—CF[—CF$_2$CF$_2$CF$_2$CF$_3$]—,
—CH$_2$—CF[—CF$_2$—O—CF(CF$_3$)—CF$_2$—O—CHF—CF$_3$]—,
—CH$_2$—CF[—CF$_2$—O—CF(CF$_3$)—CF$_2$—O—CF$_2$—CF$_3$]—,
—CH$_2$—CF[—CF$_2$—O—CF(CF$_3$)—CF$_2$—O—CF(CF$_3$)—CF$_3$]—,
—CH$_2$—CF[—CF$_2$—O—CF(CF$_3$)—CF$_2$—O—CH(CF$_3$)—CF$_2$—CF$_3$]—,
—CH$_2$—CF[—CF$_2$—O—CF(CF$_3$)—CF$_2$—O—CF(CF$_3$)—CF$_2$—CF$_3$]—,
—CH$_2$—CF[—OCF$_2$OCF$_3$]—,
—CH$_2$—CF[—OCF$_2$CF$_2$CF$_2$OCF$_3$]—,
—CH$_2$—CF[—CF$_2$OCFOCF$_3$]—,
—CH$_2$—CF[—CF$_2$OCF$_2$CF$_2$CF$_2$OCF$_3$]—, or
—CH$_2$—CF[—O—CF$_2$—CF$_3$]—,
with —CH$_2$—CF[—CF$_3$]—
being more preferable.

In the compound represented by formula (2-1) above, $Rf_2$ is a linear or branched fluorinated alkyl group with 1 to 12 carbon atoms or a linear or branched fluorinated alkoxy group with 1 to 12 carbon atoms. The fluorinated alkyl group and the fluorinated alkoxy group may each contain an oxygen atom (—O—) between carbon-carbon atoms when the number of carbon atoms is 2 or more.

The fluorinated alkyl group of $Rf_2$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_2$, a hydrogen atom may be substituted with a substituent other than a fluorine atom; however, the fluorinated alkyl group of $Rf_2$ preferably does not contain a substituent other than a fluorine atom.

Alternatively, the fluorinated alkoxy group of $Rf_2$ may be a partially fluorinated alkoxy group in which a portion of the hydrogen atoms attached to the carbon atom are substituted with fluorine atoms, or may be a perfluorinated alkoxy group in which all of the hydrogen atoms attached to the carbon atom are substituted with fluorine atoms. In the fluorinated alkoxy group of $Rf_2$, a hydrogen atom may be substituted with a substituent other than a fluorine atom; however, the fluorinated alkoxy group of $Rf_2$ preferably does not contain a substituent other than a fluorine atom.

The number of carbon atoms in $Rf_2$ is preferably 1 to 10, more preferably 1 to 6, still more preferably 1 to 4, and particularly preferably 1.

$Rf_2$ is preferably a group represented by the formula:

$$—(Rf_{21})m\text{-}(O)p\text{-}(Rf_{22}—O)n\text{-}Rf_{23}$$

wherein $Rf_{21}$ and $Rf_{22}$ are each independently a linear or branched fluorinated alkylene group with 1 to 4 carbon atoms; $Rf_{23}$ is a linear or branched fluorinated alkyl group with 1 to 4 carbon atoms; p is 0 or 1; m is an integer from 0 to 4; and n is an integer from 0 to 4.

The fluorinated alkylene group of $Rf_{21}$ and $Rf_{22}$ may be a partially fluorinated alkylene group in which a portion of the hydrogen atoms attached to the carbon atom are substituted with fluorine atoms, or may be a perfluorinated alkylene group in which all of the hydrogen atoms attached to the carbon atom are substituted with fluorine atoms. In the fluorinated alkylene group of $Rf_{21}$ and $Rf_{22}$, a hydrogen atom may be substituted with a substituent other than a fluorine atom; however, the fluorinated alkylene group of $Rf_{21}$ and $Rf_{22}$ preferably does not contain a substituent other than a fluorine atom. $Rf_{21}$ and $Rf_{22}$ may each be the same or different in each occurrence.

Examples of the fluorinated alkylene group of $Rf_{21}$ include —CHF—, —CF$_2$—, —CH$_2$—CF$_2$—, —CHF—CF$_2$—, —CF$_2$—CF$_2$—, —CF(CF$_3$)—, —CH$_2$—CF$_2$—CF$_2$—, —CHF—CF$_2$—CF$_2$—, —CF$_2$—CF$_2$—CF$_2$—, —CF(CF$_3$)—CF$_2$—, —CF$_2$—CF(CF$_3$)—, —C(CF$_3$)$_2$—, —CH$_2$—CF$_2$—CF$_2$—CF$_2$—, —CHF—CF$_2$—CF$_2$—CF$_2$—, —CF$_2$—CF$_2$—CF$_2$—CF$_2$—, —CH(CF$_3$)—CF$_2$—CF$_2$—, —CF(CF$_3$)—CF$_2$—CF$_2$—, and —C(CF$_3$)$_2$—CF$_2$—. Of these, a perfluorinated alkylene group with 1 or 2 carbon atoms is preferable, with —CF$_2$— being more preferable.

Examples of the fluorinated alkylene group of $Rf_{22}$ include —CHF—, —CF$_2$—, —CH$_2$—CF$_2$—, —CHF—CF$_2$—, —CF$_2$—CF$_2$—, —CF(CF$_3$)—, —CH$_2$—CF$_2$—CF$_2$—, —CHF—CF$_2$—CF$_2$—, —CF$_2$—CF$_2$—CF$_2$—, —CF(CF$_3$)—CF$_2$—, —CF$_2$—CF(CF$_3$)—, —C(CF$_3$)$_2$—, —CH$_2$—CF$_2$—CF$_2$—CF$_2$—, —CHF—CF$_2$—CF$_2$—CF$_2$—, —CF$_2$—CF$_2$—CF$_2$—CF$_2$—, —CH(CF$_3$)—CF$_2$—CF$_2$—, —CF(CF$_3$)—CF$_2$—CF$_2$—, and —C(CF$_3$)$_2$—CF$_2$—. Of these, a perfluorinated alkylene group with 1 to 3 carbon atoms is preferable, with —CF$_2$—, —CF$_2$CF$_2$—, —CF$_2$—CF$_2$—CF$_2$—, —CF(CF$_3$)—CF$_2$—, or —CF$_2$—CF(CF$_3$)— being more preferable.

The fluorinated alkyl group of $Rf_{23}$ may be a partially fluorinated alkyl group in which a portion of the hydrogen atoms attached to the carbon atom are substituted with fluorine atoms, or may be a perfluorinated alkyl group in which all of the hydrogen atoms attached to the carbon atom are substituted with fluorine atoms. In the fluorinated alkyl group of $Rf_{23}$, a hydrogen atom may be substituted with a substituent other than a fluorine atom; however, the fluorinated alkyl group of $Rf_{23}$ preferably does not contain a substituent (for example, —CN, —CH$_2$I, or —CH$_2$Br) other than a fluorine atom.

Examples of the fluorinated alkyl group of $Rf_{23}$ include —CH$_2$F, —CHF$_2$, —CF$_3$, —CH$_2$—CH$_2$F, —CH$_2$—CHF$_2$, —CH$_2$—CF$_3$, —CHF—CH$_2$F, —CHF—CHF$_2$, —CHF—CF$_3$, —CF$_2$—CH$_2$F, —CF$_2$—CHF$_2$, —CF$_2$—CF$_3$, —CH$_2$—CF$_2$—CH$_2$F, —CHF—CF$_2$—CH$_2$F, —CF$_2$—CF$_2$—CH$_2$F, —CF(CF$_3$)—CH$_2$F, —CH$_2$—CF$_2$—CHF$_2$, —CHF—CF$_2$—CHF$_2$, —CF$_2$—CF$_2$—CHF$_2$, —CF(CF$_3$)—CHF$_2$, —CH$_2$—CF$_2$—CF$_3$, —CHF—CF$_2$—CF$_3$, —CF$_2$—CF$_2$—CF$_3$, —CF(CF$_3$)—CF$_3$, —CH$_2$—CF$_2$—CF$_2$—CF$_3$, —CHF—CF$_2$—CF$_2$—CF$_3$, —CF$_2$—CF$_2$—CF$_2$—CF$_3$, —CH(CF$_3$)—CF$_2$—CF$_3$, —CF(CF$_3$)—CF$_2$—CF$_3$, and —C(CF$_3$)$_2$—CF$_3$. Of these, —CF$_3$, —CHF—CF$_3$, —CF$_2$—CHF$_2$, —CF$_2$—CF$_3$, —CF$_2$—CF$_2$—CF$_3$, —CF(CF$_3$)—CF$_3$, —CF$_2$—CF$_2$—CF$_2$—CF$_3$, —CH(CF$_3$)—CF$_2$—CF$_3$, or —CF(CF$_3$)—CF$_2$—CF$_3$ is preferable.

p is preferably 0.

m is preferably an integer from 0 to 2, more preferably 0 or 1, and still more preferably 0. When p is 0, m is preferably also 0.

n is preferably an integer from 0 to 2, more preferably 0 or 1, and still more preferably 0.

The repeating unit is preferably
—CHF—CH[—CF$_3$]—,
—CHF—CH[—CF$_2$CF$_3$]—,
—CHF—CH[—CF$_2$CF$_2$CF$_3$]—, or
—CHF—CH[—CF$_2$CF$_2$CF$_2$CF$_3$]—, with —CHF—CH[—CF$_3$]—
being more preferable.

In particular, the copolymerization unit preferably contains hexafluoropropylene (HFP), tetrafluoroethylene (TFE), 2,3,3,3-tetrafluoropropylene, 1,3,3,3-tetrafluoropropylene, a perfluoroalkyl vinyl ether (PAVE). Most preferably, the copolymerization unit is at least partially hexafluoropropylene (HFP). Examples of vinylidene fluoride-based elastomers in which the copolymerization unit is at least partially hexafluoropropylene (HFP) include a binary elastomer containing vinylidene fluoride and hexafluoropropylene, and a ternary elastomer containing vinylidene fluoride, tetrafluoroethylene, and hexafluoropropylene.

The PAVE is more preferably a perfluoro (methyl vinyl ether) (PMVE) or a perfluoro (propyl vinyl ether) (PPVE), with the PMVE being particularly preferable.

The PAVE may be, for example, a perfluorovinyl ether represented by the formula: $CF_2$=$CFOCF_2ORf^c$
wherein $Rf^c$ is a linear or branched perfluoroalkyl group with 1 to 6 carbon atoms, a cyclic perfluoroalkyl group with 5 or 6 carbon atoms, or a linear or branched perfluorooxyalkyl group with 2 to 6 carbon atoms that contains 1 to 3 oxygen atoms. For example, the PAVE is preferably $CF_2$=$CFOCF_2OCF_3$, $CF_2$=$CFOCF_2OCF_2CF_3$, or $CF_2$=$CFOCF_2OCF_2CF_2OCF_3$.

The VdF-based fluorine-containing elastomer is preferably at least one copolymer selected from the group consisting of a VdF/HFP copolymer, a VdF/TFE/HFP copolymer, a VdF/CTFE copolymer, a VdF/CTFE/TFE copolymer, a VdF/PAVE copolymer, a VdF/TFE/PAVE copolymer, a VdF/HFP/PAVE copolymer, a VdF/HFP/TFE/PAVE copolymer, a VdF/TFE/Pr copolymer, a VdF/Et/HFP copolymer, and a copolymer of VdF/the fluorine-containing monomer represented by formula (1-1) or (2-1). The VdF-based fluorine-containing elastomer more preferably has at least one comonomer selected from the group consisting of TFE, HFP, and a PAVE as a comonomer other than VdF.

Of these, at least one copolymer selected from the group consisting of a VdF/HFP copolymer, a VdF/TFE/HFP copolymer, a copolymer of VdF/the fluoromonomer represented by formula (1-1) or (2-1), a VdF/PAVE copolymer, a VdF/TFE/PAVE copolymer, a VdF/HFP/PAVE copolymer, and a VdF/HFP/TFE/PAVE copolymer is preferable; at least one copolymer selected from the group consisting of a VdF/HFP copolymer, a VdF/TFE/HFP copolymer, a copolymer of VdF/the fluoromonomer represented by formula (1-1) or (2-1), and a VdF/PAVE copolymer is more preferable; and at least one copolymer selected from the group consisting of a VdF/HFP copolymer, a VdF/TFE/HFP copolymer, and a VdF/PAVE copolymer is particularly preferable.

In the VdF/HFP copolymer, the composition of VdF/HFP is preferably (45 to 85)/(55 to 15) (mol %), more preferably (50 to 80)/(50 to 20) (mol %), and still more preferably (60 to 80)/(40 to 20) (mol %). The composition of VdF/HFP is also preferably (50 to 78)/(50 to 22) (mol %).

In the VdF/TFE/HFP copolymer, the composition of VdF/TFE/HFP is preferably (30 to 80)/(4 to 35)/(10 to 35) (mol %).

In the VdF/PAVE copolymer, the composition of VdF/PAVE is preferably (65 to 90)/(35 to 10) (mol %). In one preferred embodiment, the composition of VdF/PAVE may be (50 to 78)/(50 to 22) (mol %).

In the VdF/TFE/PAVE copolymer, the composition of VdF/TFE/PAVE is preferably (40 to 80)/(3 to 40)/(15 to 35) (mol %).

In the VdF/HFP/PAVE copolymer, the composition of VdF/HFP/PAVE is preferably (65 to 90)/(3 to 25)/(3 to 25) (mol %).

In the VdF/HFP/TFE/PAVE copolymer, the composition of VdF/HFP/TFE/PAVE is preferably (40 to 90)/(0 to 25)/(0 to 40)/(3 to 35) (mol %), and more preferably (40 to 80)/(3 to 25)/(3 to 40)/(3 to 25) (mol %).

In the copolymer based on VdF/the fluorine-containing monomer represented by (1-1) or (2-1), the ratio of VdF/the fluorine-containing monomer (1-1) or (2-1) unit is preferably 87/13 to 20/80 (mol %), and a further monomer unit other than VdF and the fluorine-containing monomer (1-1) or (2-1) preferably constitutes 0 to 50 mol % of total monomer units. The molar ratio in percent of VdF/the fluorine-containing monomer (1-1) or (2-1) unit is more preferably 80/20 to 20/80. In one preferred embodiment, the composition of VdF/the fluorine-containing monomer (1-1) or (2-1) unit may be 78/22 to 50/50 (mol %). Alternatively, the ratio of VdF/the fluorine-containing monomer (1-1) or (2-1) unit is preferably 87/13 to 50/50 (mol %), and a further monomer unit other than VdF and the fluorine-containing monomer (1-1) or (2-1) preferably constitutes 1 to 50 mol % of total monomer units. Preferable as the further monomer other than VdF and the fluorine-containing monomer (1-1) or (2-1) are the monomers mentioned as the comonomer of VdF, such as TFE, HFP, a PMVE, a perfluoroethyl vinyl ether (PEVE), a PPVE, CTFE, trifluoroethylene, hexafluoroisobutene, vinyl fluoride, Et, Pr, an alkyl vinyl ether, a monomer that provides crosslinkable groups, and a reactive emulsifier, with the PMVE, CTFE, HFP, and TFE being more preferable.

The TFE/Pr-based fluorine-containing elastomer refers to a fluorine-containing copolymer containing 45 to 70 mol % of TFE and 55 to 30 mol % of Pr. The TFE/Pr-based fluorine-containing elastomer may contain 0 to 40 mol % of a specific third component (for example, a PAVE), in addition to these two components.

In the Et/HFP copolymer, the composition of Et/HFP is preferably (35 to 80)/(65 to 20) (mol %), and more preferably (40 to 75)/(60 to 25) (mol %).

In the Et/HFP/TFE copolymer, the composition of Et/HFP/TFE is preferably (35 to 75)/(25 to 50)/(0 to 15) (mol %), and more preferably (45 to 75)/(25 to 45)/(0 to 10) (mol %).

Examples of perfluoroelastomers include those containing TFE/PAVE. The composition of TFE/PAVE is preferably (50 to 90)/(50 to 10) (mol %), more preferably (50 to 80)/(50 to 20) (mol %), and still more preferably (55 to 75)/(45 to 25) (mol %).

In this case, examples of the PAVE include PMVEs and PPVEs, which can be used alone or in any combination.

The fluorine content in the fluorine-containing elastomer is preferably 50% by mass or more, more preferably 55% by mass or more, and still more preferably 60% by mass or more. While the upper limit of the fluorine content is not limited, it is preferably 71% by mass or less.

The fluorine content is the value calculated from the composition of the fluorine-containing elastomer measured by 19F-NMR.

The fluorine content is calculated by calculating the molecular weight from the composition ratio, and determining the mass of fluorine atoms contained therein.

The composition ratio of each repeating unit of the fluorine-containing elastomer is herein measured using an NMR method. Specifically, the composition ratio is the value measured using the following solution NMR method:

measurement apparatus: VNMRS400; Varian Inc.
resonance frequency: 376.04 (Sfrq)
pulse width: 30° (pw=6.8)

The non-perfluorinated elastomer and the perfluoroelastomer described above can be produced using conventional methods such as emulsion polymerization, suspension polymerization, and solution polymerization. In particular, a polymerization method using an iodine (bromine) compound, which is known as iodine (bromine) transfer polymerization, can produce a fluorine-containing elastomer with a narrow molecular weight distribution.

The polymer may have a structural unit other than the vinylidene fluoride unit and the copolymerization unit (A). In this case, the content of the other polymer is preferably 50 mol % or less. Alternatively, the polymer may be a polymer consisting only of the vinylidene fluoride unit and the copolymerization unit (A). The content of the other polymer is more preferably 30 mol % or less, and still more preferably 15 mol % or less.

In the polymer, the further monomer may be a monomer that provides crosslinking sites.

The monomer that provides crosslinking sites is not limited; for example, an iodine- or bromine-containing monomer represented by the formula:

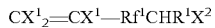

wherein $X^1$ is a hydrogen atom, a fluorine atom, or —$CH_3$; $Rf^1$ is a fluoroalkylene group, a perfluoroalkylene group, a fluoro(poly)oxyalkylene group, or a perfluoro(poly)oxyalkylene group; R1 is a hydrogen atom or —$CH_3$; and $X^2$ is an iodine atom or a bromine atom;

a monomer represented by the formula:
$CF_2$=$CFO(CF_2CF(CF_3)0)m(CF_2)n$-$X^3$ wherein m is an integer from 0 to 5; n is an integer from 1 to 3; and $X^3$ is a cyano group, a carboxyl group, an alkoxycarbonyl group, an iodine atom, or a bromine atom; or a monomer represented by the formula:
$CH_2$=$CFCF_2O(CF(CF_3)CF_2O)m(CF(CF_3))n$-$X^4$
wherein m is an integer from 0 to 5; n is an integer from 1 to 3; and $X^4$ is a cyano group, a carboxyl group, an alkoxycarbonyl group, an iodine atom, a bromine atom, or —$CH_2OH$ may be used as the further monomer.

Of these, at least one selected from the group consisting of $CF_2$=$CFOCF_2CF(CF_3)OCF_2CF_2CN$, $CF_2$=$CFOCF_2CF(CF_3)OCF_2CF_2COOH$, $CF_2$=$CFOCF_2CF_2CH_2I$, $CF_2$=$CFOCF_2CF(CF_3)OCF_2CF_2CH_2I$, $CH_2$=$CFCF_2OCF(CF_3)CF_2OCF(CF_3)CN$, $CH_2$=$CFCF_2OCF(CF_3)CF_2OCF(CF_3)COOH$, and $CH_2$=$CFCF_{20}CF(CF_3)CF_2OCF(CF_3)CH_2OH$ is preferable. The polymer may contain a repeating unit derived from the monomer that provides crosslinking sites; however, in one embodiment of the present disclosure, a cross-linking agent is not contained.

To achieve satisfactory adhesion and flexibility, as well as satisfactory solubility in a solvent, the fluorine-containing elastomer preferably has a number average molecular weight (Mn) of 7,000 to 5,000,000, preferably has a mass average molecular weight (Mw) of 10,000 to 10,000,000, and preferably has a Mw/Mn of 1.0 to 30.0, and more preferably has a Mw/Mn of 1.5 to 25.0. The number average molecular weight (Mn), the mass average molecular weight (Mw), and the Mw/Mn are the values measured using the GPC method.

The fluorine-containing elastomer has a Mooney viscosity (ML1+10 (121° C.)) at 121° C. of preferably 2 or more, more preferably 5 or more, still more preferably 10 or more, and particularly preferably 30 or more. The Mooney viscosity is the value measured in accordance with ASTM-D1646-15 and JIS K6300-1:2013.

The fluoropolymer can be produced using a general radical polymerization method. While the form of polymerization may be any of block polymerization, solution polymerization, suspension polymerization, and emulsion polymerization, emulsion polymerization is preferable in that it is easily implemented on an industrial scale.

In the polymerization, a polymerization initiator, a chain transfer agent, a surfactant, and a solvent may be used, and these components may each be a conventionally known one. In the polymerization of the copolymer, an oil-soluble radical polymerization initiator or a water-soluble radical initiator may be used as the polymerization initiator.

The oil-soluble radical polymerization initiator may be a known oil-soluble peroxide, and representative examples include dialkyl peroxycarbonates such as diisopropyl peroxydicarbonate and di-sec-butyl peroxydicarbonate; peroxy esters such as t-butyl peroxyisobutyrate and t-butyl peroxypivalate; dialkyl peroxides such as di-t-butyl peroxide; and di[perfluoro(or fluorochloro)acyl] peroxides such as di(ω-hydro-dodecafluoroheptanoyl) peroxide, di(ω-hydro-tetradecafluoroheptanoyl) peroxide, di(ω-hydro-hexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl peroxide, ω-chloro-hexafluorobutyryl-ω-chloro-decafluorohexanoyl peroxide, ω-hydro-dodecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide, and di(undecachlorodotriacontafluorodocosanoyl) peroxide.

The water-soluble radical polymerization initiator may be a known water-soluble peroxide, and examples include ammonium salts, potassium salts, sodium salts, t-butyl permaleates, and t-butyl hydroperoxides of persulfuric acid, perboric acid, perchloric acid, perphosphoric acid, and percarbonic acid. A reducing agent such as a sulfite or a sulfurous acid salt may be used in combination with such a peroxide, and the reducing agent may be used in an amount of 0.1 to 20 times the amount of the peroxide.

While the amount of the radical polymerization initiator to be added is not limited, the radical polymerization initiator may be added all at once at the beginning of the polymerization, sequentially, or continuously in at least an amount that does not significantly reduce the polymerization rate (for example, several ppm based on the water concentration). The upper limit is in the range where the heat of polymerization reaction can be removed from the surface of the apparatus.

The surfactant may be a nonionic surfactant, an anionic surfactant, a cationic surfactant, or the like, and is preferably a linear or branched fluorine-containing anionic surfactant with 4 to 20 carbon atoms, such as ammonium perfluorooctanoate or ammonium perfluorohexanoate. The amount of the surfactant to be added (based on water for polymerization) is preferably 10 to 5,000 ppm, and more preferably 50 to 5,000 ppm. Alternatively, the surfactant may be a reactive emulsifier. While the reactive emulsifier is not limited as long as it is a compound with one or more unsaturated bonds and one or more hydrophilic groups, examples include $CH_2=CFCF_2OCF(CF_3)CF_2OCF(CF_3)COONH_4$, $CH_2=CFCF_2CF(CF_3)OCF_2CF_2COONH_4$, and $CF_2=CFOCF_2CF(CF_3)OCF(CF_3)COONH_4$. The amount of the reactive emulsifier to be added (based on polymerization water) is preferably 10 to 5,000 ppm, and more preferably 50 to 5,000 ppm.

The solvent is preferably a solvent without chain transfer property. For solution polymerization, the solvent may be dichloropentafluoropropane (R-225), for example, and for emulsion polymerization and suspension polymerization, the solvent may be water, a mixture of water and a water-soluble organic solvent, or a mixture of water and a water-insoluble organic solvent.

In the polymerization, examples of the chain transfer agent include esters such as dimethyl malonate, diethyl malonate, methyl acetate, ethyl acetate, butyl acetate, and dimethyl succinate, as well as isopentane, methane, ethane, propane, isopropanol, acetone, various mercaptans, carbon tetrachloride, and cyclohexane.

Alternatively, the chain transfer agent may be a bromine compound or an iodine compound. Examples of polymerization methods using a bromine compound or an iodine compound include a method in which emulsion polymerization is conducted in the water medium while applying pressure, in the presence of the bromine compound or iodine compound, substantially under oxygen-free conditions (iodine transfer polymerization method). Representative examples of the bromine compound or iodine compound to be used include a compound represented by the formula: R2IxBry wherein x and y are each an integer from 0 to 2, and satisfy $1 \le x+y \le 2$; and R2 is a saturated or unsaturated fluorohydrocarbon or chlorofluorohydrocarbon group with 1 to 16 carbon atoms, or a hydrocarbon group with 1 to 3 carbon atoms, which optionally contains an oxygen atom.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, a monoiodomonobromo-substituted benzene, a diiodomonobromo-substituted benzene, as well as (2-iodoethyl)- and (2-bromoethyl)-substituted benzenes. These compounds may be used alone or in combination with each other.

Of these, 1,4-diiodoperfluorobutane, 1,6-diiodoperfluorohexane, and 2-iodoperfluoropropane are preferably used, because of their polymerization reactivity, crosslinking reactivity, and ease of availability.

The copolymer may be in any form, such as an aqueous dispersion or powder. In the case where emulsion polymerization is employed, the copolymer as a powder can be produced by coagulating the dispersion soon after polymerization, washing the resulting product with water, dehydrating, and drying. The coagulation can be accomplished by adding an inorganic acid or an inorganic salt such as aluminum sulfate, by applying mechanical shear force, or by freezing the dispersion. In the case where suspension polymerization is employed, the copolymer as a powder can be obtained by collecting it from the dispersion soon after polymerization, and drying. In the case where solution polymerization is employed, the copolymer as a powder can be obtained by drying the fluorine-containing polymer containing solution as is, or by purifying the fluorine-containing polymer by dropwise addition of a poor solvent.

The copolymer may be a single copolymer, or two or more copolymers. In particular, the copolymer may be a combination of two copolymers with different molecular structures.

The binder of the present disclosure is used in a slurry for a solid-state battery comprising sulfide-based solid electrolyte particles. Specifically, the binder is used in a slurry for forming a layer that constitutes a solid-state battery. More specifically, the binder is used in a slurry for a solid-state battery comprising sulfide-based solid electrolyte particles, a binder, and a solvent.

In the slurry of the present disclosure, the solvent is preferably a low-polarity solvent. The use of a low-polarity solvent is preferable because the solvent is less likely to react with the sulfide-based solid electrolyte particles. As used herein, the low-polarity solvent is defined as a solvent with a dielectric constant of less than 20, preferably less than 10, at a frequency of 100 kHz. The solvent preferably contains at least one compound selected from the group consisting of aromatic compounds, ester compounds, aliphatic hydrocarbon compounds, ether compounds, and carbonate compounds. Aromatic compounds and ester compounds are preferable, and ester compounds are most preferable.

Examples of the low-polarity solvent include, but are not limited to, n-octane, n-nonane, n-decane, n-butyl ether, diisopentyl ether, ethyl benzene, ethyl acetate, ethyl butyrate, butyl butyrate, propyl propionate, butyl methacrylate, dimethyl carbonate, diethyl carbonate, methyl phenyl ether, cyclopentyl methyl ether, ethylene carbonate, diphenyl ether, fluorobenzene, trifluoromethylbenzene, bistrifluoromethylbenzene, benzene, and thiols.

Of these, at least one solvent selected from the group consisting of propyl propionate, butyl methacrylate, ethyl acetate, ethyl butyrate, and butyl butyrate can be more suitably used. A solvent mixture of two or more of them may also be used.

The slurry of the present disclosure contains a sulfide-based solid electrolyte. The sulfide-based solid electrolyte may be any that is selected from $Li_2S$—$P_2S_5$, $Li_2S$—$P_2S_3$, $Li_2S$—$P_2S_3$—$P_2S_5$, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2S$—$SiS_2$—$P_2S_5$, $Li_2S$—$SiS_2$—$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.25}Ge_{0.76}S_4$, $Li_4$-$xGe_{1-x}P_xS_4$, and the like, or a mixture of two or more of them, although not limited thereto.

The slurry of the present disclosure preferably has a low water content, which is specifically 1,000 ppm or less, more preferably 500 ppm or less, and most preferably 100 ppm or less.

The slurry of the present disclosure may be used as a slurry for a positive electrode or a slurry for a negative electrode. The slurry of the present disclosure may also be used as a slurry for forming a solid electrolyte. When the slurry of the present disclosure is used as a slurry for an electrode, it further contains active material particles. The active material particles may be a positive electrode active material or a negative electrode active material. The slurry of the present disclosure is more suitable for use as a slurry for a negative electrode that contains a negative electrode active material.

When the slurry of the present disclosure is used as a slurry for a positive electrode, it contains a positive electrode active material. The positive electrode active material may be any known positive electrode active material for a solid-state battery. In particular, the positive electrode active material is preferably a material that can occlude and release lithium ions.

Specific examples of the positive electrode active material include $LiCoO_2$, $Li(Ni,Co,Al)O_2$, $Li_{1+x}Ni_{1/3}Mn_{1/3}Co_{1/3}O_2$ wherein x is a real number of 0 or more, $LiNiO_2$, $LiMn_2O_4$, $LiCoMnO_4$, $Li_2NiMn_3O_8$, $Li_3Fe_2(PO_4)_3$, $Li_3V_2(PO_4)_3$, a different element-substituted Li—Mn spinel with the composition represented by $Li_{1+x}Mn_{2-x-y}M_yO_4$ wherein M is at least one metal selected from the group consisting of Al, Mg, Co, Fe, Ni, and Zn, and y is a real number of 0 or more, lithium titanate ($Li_xTiO_y$), and a lithium metal phosphate with the composition represented by $LiMPO_4$ wherein M is Fe, Mn, Co, or Ni.

Of these, $LiCoO_2$, $Li(Ni,Co,Al)O_2$, and $LiNi_{1/3}Mn_{1/3}Co_{1/3}O_2$ are preferably used herein as the positive electrode active material. Alternatively, a positive electrode active material formed by coating the surface of each of these materials may be used herein. The coating material that may be used herein may be any that contains a substance having lithium-ion conductivity, and capable of maintaining the form of the coating layer on the surface of the active material. Examples of the coating material include $LiNbO_3$, $Li_4Ti_5O_{12}$, and $Li_3PO_4$. While the shape of the positive electrode active material is not limited, it is preferably a powder.

The positive electrode active material has an average particle diameter of, for example, 1 to 50 μm, preferably 1 to 20 μm, and particularly preferably 3 to 7 μm. If the positive electrode active material has an excessively small average particle diameter, the handleability may become poor, whereas if the positive electrode active material has an excessively large average particle diameter, it may be difficult to produce a flat positive electrode active material layer. The average particle diameter of the positive electrode active material can be determined by, for example, measuring and averaging the particle diameters of the active material carrier as observed by scanning electron microscopy (SEM).

Examples of the negative electrode active material include, but are not limited to, any that is selected from those containing carbonaceous materials such as artificial graphite, graphite carbon fibers, resin calcination carbon, pyrolytic vapor-grown carbon, coke, mesocarbon microbeads (MCMBs), furfuryl alcohol resin calcination carbon, polyacene, pitch-based carbon fibers, vapor-grown carbon fibers, natural graphite, and non-graphitizing carbon; silicon-containing compounds such as silicon and silicon alloys; $Li_4Ti_5O_{12}$; and the like; or a mixture of two or more of them. Of these, a negative electrode active material at least partially containing a carbonaceous material, or a silicon-containing compound can be particularly suitably used.

The slurry for a sulfide-based solid-state battery of the present disclosure may further optionally contain a conductive aid. While the conductive aid used herein is not limited as long as it can improve the conductivity in the target positive electrode for a sulfide-based solid-state battery, examples include carbon black such as acetylene black and ketjen black; carbon fibers such as multi-walled carbon nanotubes, single-walled carbon nanotubes, carbon nanofibers, and vapor-grown carbon fibers (VGCFs); and metal powders such as SUS powders and aluminum powder.

The slurry may contain a material other than the materials mentioned above. However, the content of the material is preferably 8% by mass or less, and more preferably 4% by mass or less, based on the volume of the entire slurry taken as 100% by mass.

In the process of preparing the slurry of the present disclosure, the above-mentioned components are mixed to form a slurry. The order of mixing the components is not limited, and the components may be added to the solvent and mixed. However, from the viewpoint of obtaining a slurry in which the binder is dissolved, it is preferable to mix the components using the following method.

In the process of preparing the slurry, it is desirable to prepare a binder solution by dissolving the binder in the solvent in advance, and then mix the binder solution with other materials.

The slurry is preferably prepared herein using the following procedures:

(1) the binder is dissolved in the solvent to obtain a "binder solution";

(2) the binder solution obtained in (1) is added to the solvent together with the separately prepared sulfide-based solid electrolyte or optionally used positive electrode active material or negative electrode active material, and the mixture is subjected to dispersion treatment (for example, ultrasonic treatment) to obtain a "solid electrolyte/binder slurry" in which the sulfide-based solid electrolyte is highly dispersed in the solvent or an "active material/binder slurry" in which the active material is highly dispersed in the solvent; and (3) for forming a slurry for an electrode, the sulfide-based solid electrolyte or the electrode active material is added to the "active material/binder slurry" or "solid electrolyte/binder slurry" obtained in (2), and the mixture is subjected to dispersion treatment (for example, ultrasonic treatment) to obtain a "slurry for an electrode" in which the electrode active material and the sulfide-based solid electrolyte are highly dispersed in the solvent.

By thus adding stepwise the binder, the sulfide-based solid electrolyte, and the optionally used electrode active material, and sequentially subjecting them to the dispersion treatment, it is possible to easily obtain a slurry in which the components are highly dispersed in the solvent. Similarly, when an optional component (such as a conductive aid) other than these components is to be added, it is preferable to add the component and sequentially subject the mixture to the dispersion treatment.

It should be noted, however, that a slurry can also be obtained by adding the binder, the sulfide-based solid electrolyte, and the optionally used electrode active material, as well as an optional component to the solvent at once, and subjecting the mixture to the dispersion treatment at once.

The dispersion treatment may be, for example, ultrasonic treatment as described above. Other examples include dispersion with a high-speed disc.

As used herein, "solution" refers to the "binder solution" obtained in the step (1) above in which the binder is dissolved in the solvent.

In the process of preparing the slurry, the mixture ratio of the binder, the sulfide-based solid electrolyte, and the optionally used electrode active material may be any known mixture ratio that allows each of the formed layers to function appropriately.

It is particularly preferable to include 0.5 part by mass or more and 4.5 parts by mass or less of the binder, based on a total solids content of 100 parts by mass in the slurry. If the amount of the binder is excessively small, when an electrode is formed, the adhesion between particles such as the electrolyte as well as the adhesion between a current collector and particles such as the electrolyte may become poor, which may make handling of the electrode difficult. Conversely, if the amount of the binder is excessively large, the resistance of the electrode may increase, and a solid-state battery with sufficient performance may not be obtained.

In the process of preparing the slurry of the present disclosure, the amount of solids (the electrode active material, the sulfide-based solid electrolyte, and the binder) in the solvent is, for example, such that the solids content in the slurry is 30% by mass or more and 75% by mass or less, although not limited thereto. When the solids content falls in this range, an electrode and a solid electrolyte layer can be produced more easily. The lower limit of the solids content is more preferably 50% by mass or more, and the upper limit is more preferably 70% by mass or less.

The slurry of the present disclosure can be used to form an electrode for a solid-state battery and/or an electrolyte layer for a sulfide-based solid-state battery. While the method for producing such an electrode for a solid-state battery is not limited, the electrode may be produced by the following steps:

(1) preparing a substrate; (2) preparing a slurry; and (3) applying the slurry to form an electrode for a sulfide-based solid-state battery.

The steps (1) to (3) will be hereinafter described in order.

Step (1): preparing a substrate

The substrate used herein is not limited as long as it has a flat surface such that the slurry can be applied thereto. The substrate may have a plate shape or a sheet shape. Alternatively, the substrate may be prepared in advance, or may be a commercial substrate.

The substrate used herein may be a substrate used in a sulfide-based solid-state battery after the formation of the electrode for a sulfide-based solid-state battery and/or the electrolyte layer for a sulfide-based solid-state battery, or may be a substrate not used as a material for a sulfide-based solid-state battery. Examples of the substrate used in a sulfide-based solid-state battery include electrode materials such as a current collector; and materials for sulfide-based solid electrolyte layers such as a sulfide-based solid electrolyte membrane. The electrode for a sulfide-based solid battery and/or the electrolyte layer for a sulfide-based solid-state battery obtained using the slurry of the present disclosure may be used as a substrate, and additionally, an electrode for a sulfide-based solid-state battery and/or an electrolyte layer for a sulfide-based solid-state battery may be formed on the substrate.

Examples of the substrate not used as a material for a sulfide-based solid-state battery include substrates for transferring such as a transfer sheet and a transfer substrate. The electrode for a sulfide-based solid-state battery and/or the electrolyte layer for a sulfide-based solid-state battery formed on a substrate for transferring may be bonded by hot pressing or the like to an electrode for a sulfide-based solid-state battery and/or an electrolyte layer for a sulfide-based solid-state battery, and then the substrate for transferring may be peeled off to form an electrode for a sulfide-based solid-state battery on the sulfide-based solid electrolyte layer.

An electrode active material layer for a sulfide-based solid-state battery formed on a substrate for transferring may be bonded by hot pressing or the like to a current collector, and then the substrate for transferring may be peeled off to obtain an electrode for a sulfide-based solid-state battery in which the electrode active material layer is formed on the current collector for an electrode.

Step (2): preparing a slurry

This step can be conducted according to the method of preparing the slurry described above.

Step (3): applying the slurry to form an electrode for a sulfide-based solid-state battery In this step, the slurry is applied to at least either one of the surfaces of the substrate to form an electrode for a sulfide-based solid-state battery.

The electrode for a sulfide-based solid-state battery may be formed on only one surface of the substrate or on both surfaces of the substrate.

The slurry application method, drying method, and the like may be selected appropriately. Examples of the application method include spraying, screen printing, doctor blade, bar coating, roll coating, gravure printing, and die coating methods. Examples of the drying method include vacuum drying, heat drying, and vacuum heat drying. The conditions for vacuum drying or heat drying are not specifically restricted, and may be adjusted appropriately.

While the amount of the slurry to be applied depends on the composition of the slurry, the purpose of the target electrode for a sulfide-based solid-state battery, and the like, it may be about 5 to 30 mg/cm$^2$ on a dry basis. The thickness of the electrode for a sulfide-based solid-state battery may be about 10 to 250 μm, although not limited thereto.

The electrode for a sulfide-based solid-state battery according to the present disclosure may comprise a current collector and a lead connected to the current collector, in addition to the active material layer.

While the thickness of the active material layer used herein depends on the purpose of the target sulfide-based solid-state battery and the like, it is preferably 10 to 250 μm, particularly preferably 20 to 200 μm, and most preferably 30 to 150 μm.

The current collector used herein is not limited as long as it functions to collect electric current in the active material layer.

Examples of materials of a positive electrode current collector include aluminum, SUS, nickel, iron, titanium, chromium, gold, platinum, and zinc, with aluminum and SUS being preferable. Examples of shapes of the positive electrode current collector include a foil shape, a plate shape, and a mesh shape, with the foil shape being preferable.

When the binder content in the positive electrode for a sulfide-based solid-state battery according to the present disclosure is 0.5 to 10% by mass based on the positive electrode for a sulfide-based solid-state battery (preferably the electrode active material layer), excellent adhesion is exhibited, and the sulfide-based solid-state battery formed using the positive electrode exhibits high output.

The present disclosure also provides a secondary solid-state battery comprising the electrode for a solid-state battery described above. The secondary solid-state battery is preferably a lithium-ion battery. The sulfide-based solid-state battery of the present disclosure is a sulfide-based solid-state battery comprising a positive electrode, a negative electrode, and a sulfide-based solid electrolyte layer interposed between the positive electrode and the negative electrode, wherein the positive electrode and/or the negative electrode contains the binder of the present disclosure described above.

FIG. 1 is a diagram showing one exemplary laminated structure of a sulfide-based solid-state battery according to the present disclosure. The Figure schematically shows a cross section cut in the laminated direction. It should be noted that the sulfide-based solid-state battery according to the present disclosure is not limited to this example only.

The sulfide-based solid-state battery comprises a positive electrode 6 including a positive electrode active material layer 2 and a positive electrode current collector 4; a negative electrode 7 including a negative electrode active material layer 3 and a negative electrode current collector 5; and a sulfide-based solid electrolyte layer 1 interposed between the positive electrode 6 and the negative electrode 7.

Each of the positive electrode and the negative electrode used herein is the same as the electrode for a sulfide-based solid-state battery described above. The following describes in detail the negative electrode and the sulfide-based solid electrolyte layer used in the sulfide-based solid-state battery according to the present disclosure, as well as a separator and a battery case suitable for use in the sulfide-based solid-state battery according to the present disclosure.

The negative electrode current collector used herein is not limited as long as it functions to collect electric current in the negative electrode active material layer.

Examples of materials of a negative electrode current collector include chromium, SUS, nickel, iron, titanium, copper, cobalt, and zinc, with copper, iron, and SUS being preferable. Examples of shapes of the negative electrode current collector include a foil shape, a plate shape, and a mesh shape, with the foil shape being preferable.

When the binder content in the negative electrode for a sulfide-based solid-state battery according to the present disclosure is 0.5 to 10% by mass based on the negative electrode for a sulfide-based solid-state battery (preferably the electrode active material layer), excellent adhesion is exhibited, and the sulfide-based solid-state battery obtained using the negative electrode exhibits high output.

The sulfide-based solid electrolyte layer used herein is not limited as long as it contains the sulfide-based solid electrolyte described above. The sulfide-based solid electrolyte layer used herein is preferably a layer composed of the sulfide-based solid electrolyte described above.

The sulfide-based solid-state battery of the present disclosure may comprise a separator between the positive electrode and the negative electrode. Examples of the separator include porous membranes such as polyethylene and polypropylene; and nonwoven fabrics made of resins such as polypropylene, and nonwoven fabrics such as glass fiber nonwoven fabrics.

The sulfide-based solid-state battery of the present disclosure may further comprise a battery case. While the shape of the battery case used herein is not limited as long as it can house the positive electrode, the negative electrode, the electrolyte layer for a sulfide-based solid-state battery, and the like described above, specific examples include a cylindrical shape, a rectangular shape, a coin shape, and a laminated shape.

The method for producing the sulfide-based solid-state battery of the present disclosure is a method for producing a sulfide-based solid-state battery comprising a positive electrode, a negative electrode, and an electrolyte layer for a sulfide-based solid-state battery interposed between the positive electrode and the negative electrode, which comprises preparing the electrolyte layer for a sulfide-based solid-state battery; kneading the positive electrode or negative electrode active material, a sulfide-based solid electrolyte, a binder, and a solvent or a dispersion medium to prepare a slurry; and forming the positive electrode by applying the slurry to one surface of the electrolyte layer for a sulfide-based solid-state battery, and forming the negative electrode on the other surface of the electrolyte layer for a sulfide-based solid-state battery to produce a sulfide-based solid-state battery.

EXAMPLES

The present disclosure will be hereinafter described in detail based on examples. In the following examples, "part(s)" and "%" represent "part(s) by mass" and "% by mass", respectively, unless otherwise specified.

(Method for Producing a Binder)
(Binder 2 for Examples)

A 3-L stainless steel autoclave was charged with 1,650 ml of pure water and nitrogen purged, slightly pressurized with hexafluoropropylene (HFP), and adjusted to a temperature of 80° C. with stirring at 380 rpm, and then HFP was added to a pressure of 0.23 MPa, and a monomer mixture at a molar ratio of vinylidene fluoride (VdF) to HFP of 78.2/21.8 was also added to a pressure of 1.472 MPa. 0.097 cc of 2-methylbutane was added under nitrogen pressure, and 36.4 g of ammonium persulfate dissolved in 80 ml of pure water was added under nitrogen pressure to initiate polymerization. When the pressure decreased to 1.44 MPa, the pressure was increased to 1.50 MPa with the successive monomers. After this process was repeated for about 9.3 hours, 607 g of the successive monomers were charged, the autoclave was vented and cooled, and 2,299 g of a dispersion was collected. The solids content in the dispersion was 26.9 wt %. This dispersion was coagulated by adding magnesium chloride, and dried to obtain 610 g of a polymer. The polymer contained HFP and VdF in a molar ratio of 22.1/77.9. The Mooney viscosity (ML1+10 (121° C.)) of the polymer was 140, and the Tg was determined as −18° C. by DSC. Enthalpy of fusion was not detected in the second run.

(Binders 1 and 3 to 6 for Examples)

Using the same method as above, polymer compositions were prepared to have the compositions of the binders 1 and 3 to 6 as shown in Table 1.

(Binder 7 for Comparative Examples) KF7200 (Kureha) was used as the binder 7.

(Binder 10 for Comparative Examples)

A 3-L stainless steel autoclave was charged with 1,716 ml of pure water, 0.3432 g of a 50% aqueous solution of $CH_2=CFCF_2OCF(CF_3)CF_2OCF(CF_3)COONH_4$, and 3.421 g of a 50% aqueous solution of $C_5F_{11}COONH_4$ and nitrogen purged, slightly pressurized with HFP, and adjusted to a temperature of 80° C. with stirring at 560 rpm, and then HFP was added to a pressure of 0.56 MPa, VdF was added to a pressure of 0.69 MPa, and a liquidous monomer mixture at a molar ratio of VdF, TFE, and HFP of 70.2/11.3/18.5 was also added to a pressure of 2.000 MPa. 0.0218 g of ammonium persulfate dissolved in 4 ml of pure water was added under nitrogen pressure to initiate polymerization. When the amount of the successive monomers reached 12 g, 2.5022 g of 1,4-diiodoperfluorobutane was added. When the pressure decreased to 1.97 MPa, the pressure was increased to 2.03 MPa with the successive monomers. After this process was repeated for about 5.0 hours, 572 g of the successive monomers were charged, the autoclave was vented and cooled, and 2,302 g of a dispersion was collected. The solids content in the dispersion was 23.5 wt %. This dispersion was coagulated by adding aluminum sulfate, and dried to obtain 571 g of a polymer. The polymer contained VdF, TFE, and HFP at a molar ratio of 69.9/11.2/18.9. The Mooney viscosity (ML1+10 (121° C.)) of the polymer was 48, and the Tg was determined as −20° C. by DSC. Enthalpy of fusion was not detected in the second run.

(Binder 8 for Comparative Examples)

Using the same method as above, a polymer composition was prepared to have the composition of the binder 8 as shown in Table 1.

(Binder 9 for Comparative Examples)

A 3-L stainless steel autoclave was charged with 1.7 L of pure water, 0.17 g of a 50% aqueous solution of CH2=CFCF2OCF(CF3)CF2OCF(CF3)COONH4, and 6.8 g of a 50% aqueous solution of F(CF2)5COONH4, and the system was thoroughly purged with nitrogen gas. The temperature was increased to 80° C. with stirring at 600 rpm, and then monomers were added such that the initial monomeric composition in the vessel was VdF/HFP=45/55 (molar ratio), and the pressure was 1.52 MPa. Subsequently, a polymerization initiator solution formed by dissolving 60 mg of ammonium persulfate (APS) in 5 ml of pure water was added under nitrogen gas pressure to initiate the reaction. When the internal pressure decreased to 1.42 MPa as polymerization proceeded, an additional monomer mixture at VdF/HFP=78/22 (molar ratio) was added until the internal pressure reached 1.52 MPa. At this time, 2.15 g of diiodine compound I(CF2)4I was added under pressure. While repeatedly increasing and decreasing the pressure, a polymerization initiator solution formed by dissolving 60 mg of APS in 5 ml of pure water was added under nitrogen gas pressure every 3 hours, to continue the polymerization reaction. When 600 g of the monomer mixture was added, unreacted monomers were released, and the autoclave was cooled, and 2,364 g of a dispersion of a fluoroelastomer with a solids concentration of 25.8% by mass was obtained. The polymerization time was 7.1 hours. NMR analysis of the copolymer composition of this fluoroelastomer demonstrated that VdF/HFP=78/22 (molar ratio), and the Mooney viscosity (ML1+10 (121° C.)) was 35.

Table 1 shows the binders used in the examples and comparative examples.

TABLE 1

| | Composition | Composition Ratio | Fluorine Content | Mooney Viscosity ML (1 + 10) 121° C. | Amount of Polar End Groups | Glass Transition Temperature [° C.] | Presence/Absence of Crystalline Melting Point in Second Run |
|---|---|---|---|---|---|---|---|
| Binder 1 | VdF/HFP | 78/22 | 66% | 21 | 0.05 | −18 | Absent |
| Binder 2 | VdF/HFP | 78/22 | 66% | 140 | 0.05 | −18 | Absent |
| Binder 3 | VdF/HFP | 77/23 | 66% | 40 | 0.17 | −18 | Absent |
| Binder 4 | VdF/TFE/HFP | 77/6/17 | 66% | 43 | 0.08 | −20 | Absent |
| Binder 5 | VdF/TFE/HFP | 61/21/18 | 69% | 45 | 0.10 | −15 | Absent |
| Binder 6 | VdF/TFE/HFP | 61/21/18 | 69% | 66 | 0.09 | −15 | Absent |
| Binder 7 | VdF | 100 | 59% | — | below detection limit | None | Present |
| Binder 8 | VdF/TFE/HFP | 50/20/30 | 71% | 19 | below detection limit | −5 | Absent |
| Binder 9 | VdF/HFP | 78/22 | 66% | 35 | below detection limit | −18 | Absent |

TABLE 1-continued

|  | Composition | Composition Ratio | Fluorine Content | Mooney Viscosity ML (1 + 10) 121° C. | Amount of Polar End Groups | Glass Transition Temperature [° C.] | Presence/Absence of Crystalline Melting Point in Second Run |
|---|---|---|---|---|---|---|---|
| Binder 10 | VdF/TFE/HFP | 70/12/18 | 67% | 48 | below detection limit | −20 | Absent |

(Preparation of Binder Solutions)

Each binder was placed in a vacuum dryer and vacuum dried at 50° C. for 12 hours, then the binder was added to a solvent and stirred overnight, and thereafter, subjected to ultrasonic treatment (90 seconds) repeatedly 3 times using an ultrasonic homogenizer to prepare a binder solution. Here, the binder content was 5% by mass based on the entire binder solution taken as 100% by mass. Table 1 shows the compositions of the binders of the examples. Tables 2 and 3 show the combinations of the binders and solvent.

Examples 1 to 8 and Comparative Examples 1 to 5

Slurries for positive electrodes and negative electrodes, and solid electrolyte layers were prepared herein by the following procedures.

(Preparation of Slurries for Negative Electrodes)

Using the binder solutions thus prepared, slurries for negative electrodes according to the examples and comparative examples were prepared. The preparation was conducted specifically as follows:

To a PET container, each of the binder solutions and graphite as a negative electrode active material were added together with the solvent contained in the binder solution, and the mixture was subjected to ultrasonic treatment (50 seconds) once using an ultrasonic homogenizer to prepare a "negative electrode active material/binder slurry". To the negative electrode active material/binder slurry, the binder solution, the solvent, and a sulfide-based solid electrolyte (30LiI.70(0.75Li$_2$S.0.25P$_2$S$_5$)) were further added, and the mixture was subjected to ultrasonic treatment (30 seconds) three times using an ultrasonic homogenizer to obtain a "slurry for a negative electrode" in which the negative electrode active material, the sulfide-based solid electrolyte, and the binder were highly dispersed. The binder solids concentration in the final slurry was 3.0% by mass.

(Preparation of Negative Electrodes)

Each slurry for a negative electrode was applied onto a copper foil as a negative electrode current collector using a doctor blade, and dried, to obtain a negative electrode in which a negative electrode layer with a thickness of 110 μm was formed on the surface of the negative electrode current collector.

Table 2 shows the evaluation results for the negative electrodes.

(Preparation of Positive Electrodes)

Slurries for positive electrodes were obtained using butyl butyrate as a solvent, the ternary active material Li(NiMnCo)$_{1/3}$O$_2$ as a positive electrode active material, the sulfide-based solid electrolyte described above as a solid electrolyte, and the binder solutions described above as a binder, while adjusting the binder solids concentration in the slurry to 5% by mass. Each slurry for a positive electrode thus prepared was applied onto an aluminum foil as a positive electrode current collector using a doctor blade, and dried, to obtain a positive electrode in which a positive electrode layer with a thickness of 85 μm was formed on the surface of the positive electrode current collector.

Table 3 shows the evaluation results for the positive electrodes.

(Preparation of Solid Electrolyte Sheets)

An electrolyte slurry was prepared using butyl butyrate as a solvent, the sulfide-based solid electrolyte described above as a solid electrolyte, and the binder solution containing the binder (3) or (9) as a binder solution, and the electrolyte slurry thus prepared was applied onto a releasable substrate (PTFE sheet) using a doctor blade, and dried, to form a solid electrolyte sheet with a thickness of 45 μm on the substrate. The mass ratio of the solid electrolyte to the binder in the solid electrolyte sheet was solid electrolyte:binder=100 parts by mass:1 part by mass.

The solid electrolyte slurries were prepared as follows. The solid electrolyte and each binder solution were added to the solvent butyl butyrate, and the mixture was subjected to ultrasonic treatment (30 seconds) once using an ultrasonic homogenizer to obtain an electrolyte slurry in which the solid electrolyte and the binder were highly dissolved or dispersed. The solids content at this time was 49%.

TABLE 2

|  | Binder | Solvent | Solubility (Low-Polarity Solvent) | Adhesion | Flexibility |
|---|---|---|---|---|---|
| Example 1 | Binder 1 | Butyl Butyrate | Good | 128 | Good |
| Example 2 | Binder 1 | Propyl Propionate | Good | 125 | Good |
| Example 3 | Binder 2 | Butyl Butyrate | Good | 233 | Good |
| Example 4 | Binder 3 | Butyl Butyrate | Good | 108 | Good |
| Example 5 | Binder 4 | Butyl Butyrate | Good | 149 | Good |
| Example 6 | Binder 5 | Butyl Butyrate | Good | 118 | Good |
| Example 7 | Binder 6 | Butyl Butyrate | Good | 111 | Good |
| Comparative Example 1 | Binder 7 | Butyl Butyrate | Poor | — | — |
| Comparative Example 2 | Binder 8 | Butyl Butyrate | Poor | — | — |
| Comparative Example 3 | Binder 9 | Butyl Butyrate | Good | 40 | Poor |
| Comparative Example 4 | Binder 10 | Butyl Butyrate | Good | 100 | Poor |

TABLE 3

|  | Binder | Solvent | Solubility (Low-Polarity Solvent) | Adhesion | Flexibility |
|---|---|---|---|---|---|
| Example 8 | Binder 2 | Butyl Butyrate | Good | 191 | Good |
| Comparative Example 5 | Binder 10 | Butyl Butyrate | Good | 100 | Poor |

The slurries thus obtained were evaluated according to the following criteria. The results are shown in Tables 1 to 3.

The evaluation methods are as shown below.

(Amount of Polar End Groups)

The composition analysis by NMR was conducted using the method described above, and the proportion ([—CH$_2$OH]+[—COOH])/([—CH$_3$]+[—CF$_2$H]+[—CH$_2$OH]+[—CH$_2$I]+[—OC(O)RH]+[—COOH]) was calculated.

(Glass Transition Temperature)

In accordance with ASTM E1356-98, the glass transition temperature was determined based on thermal absorption in the second run, using the midpoint method by using a DSC apparatus from METLER TOLEDO. The results are shown in Table 1. The presence or absence of a crystalline melting point in the second run was also observed. Samples with no crystalline melting point in the second run were determined as "amorphous".

Measurement Conditions:
temperature-increasing rate; 20° C./min
sample amount; 10 mg
heat cycle; −100 to 220° C., heating, cooling, heating <Results of Evaluation of the Solubility Between Electrolyte and Solvent>

As shown in Table 2, when propyl propionate or butyl butyrate was used as the solvent, the binder was dissolved and the reaction between the solvent and the sulfide-based solid electrolyte was suppressed. In contrast, in Comparative Examples 1 and 2, the binder was not dissolved, and a homogeneous slurry was not prepared.

<Flexibility (Electrode Bending Test)>

Each of the electrodes thus prepared was cut to a size of 3 cm in length and 6 cm in width and then roll-pressed at a pressure of 10 t using a roll press. The electrode was folded 1800 and then unfolded, and the cracking occurred on the electrode was visually observed. Samples without cracking were evaluated as good, and samples with cracking were evaluated as poor.

(Long-Term Reliability)

The electrolyte sheet thus prepared was loaded into a sample bottle, and the bottle was sealed. The sample was opened in a chamber pre-adjusted to a humidity of 50% RH, and exposed to moisture in the air in the chamber to accelerate degradation. One hour after, the sample was removed, and the condition was observed. The solid electrolyte was also subjected to AC impedance measurement at a frequency of 10 MHz to 0.01 Hz, using an impedance analyzer (Solartron: SI-1260), and the conductivity was calculated based on the measurement result. The conductivity before exposure of the sample obtained using the binder (3) was 4×10$^{-4}$ S/cm.

<Adhesion Force (90 Degree Peel Test on the Electrode/Current Collector Interface)>

The electrode side of each positive electrode or negative electrode cut to a size of 1.2×8.0 cm was fixed to a movable jig, while tape was applied to the current collector side, and the stress (N/mm) when the tape side was pulled at 90 degrees at a rate of 100 mm/min was measured using an autograph. A 1 N load cell was applied for the autograph. Relative comparisons were made based on the result of Comparative Example 4 taken as 100. As for Example 8 in which the positive electrode active material was used, a relative evaluation was made based on the result of Comparative Example 5 taken as 100. In Comparative Examples 1 and 2, the binder was not dissolved in butyl butyrate, and the preparation of an electrode was difficult; thus, adhesion and flexibility could not be evaluated.

The results in Tables 2 and 3 show that all of the binders of the examples have superior adhesion force compared to the conventional binders.

Moreover, the evaluation of long-term reliability showed that the sample obtained using the binder (3) retained its shape after exposure, whereas the sample obtained using the binder (9) became brittle, and was difficult to pick up and remove with tweezers. The conductivity after exposure of the sample obtained using the binder (3) was 4×10$^{-5}$ S/cm.

It is also noted that a binder that satisfies 0.01≤([—CH$_2$OH]+[—COOH])/([—CH$_3$]+[—CF$_2$H]+[—CH$_2$OH]+[—CH$_2$I]+[—OC(O)RH]+[—COOH])≤0.25 has superior flexibility compared to binders that fall outside this range. It is thus obvious that a binder that satisfies the parameter described above is preferably used for applications such that flexibility is particularly required.

INDUSTRIAL APPLICABILITY

The binder of the present disclosure can be used as a binder in a slurry for a solid-state battery.

REFERENCE SIGNS LIST

1: sulfide-based solid electrolyte layer
2: positive electrode active material layer
3: negative electrode active material layer
4: positive electrode current collector
5: negative electrode current collector
6: positive electrode
7: negative electrode

The invention claimed is:

1. A binder used in a slurry for a solid-state battery comprising sulfide-based solid electrolyte particles,
the binder comprising a fluorine-containing elastomer in which resin end functional groups satisfy:

$$0.01 \leq ([—CH_2OH]+[—COOH])/([—CH_3]+[—CF_2H]+[—CH_2OH]+[—CH_2I]+[—OC(O)RH]+[—COOH]) \leq 0.25$$

wherein R represents an alkyl group with 1 to 20 carbon atoms.

2. The binder according to claim 1, wherein the fluorine-containing elastomer contains a vinylidene fluoride (VdF) monomer unit and a copolymerization unit.

3. The binder according to claim 2, wherein the copolymerization unit in the fluorine-containing elastomer is at least one copolymerization unit selected from the group consisting of hexafluoropropylene (HFP), tetrafluoroethylene (TFE), 2,3,3,3-tetrafluoropropylene, 1,3,3,3-tetrafluoropropylene, and a perfluoroalkyl vinyl ether (PAVE).

4. The binder according to claim 2, wherein the copolymerization unit in the fluorine-containing elastomer is at least partially hexafluoropropylene (HFP).

5. The binder according to claim 1, wherein the binder has a fluorine content of 60 to 71% by mass.

6. The binder according to claim 1, wherein the binder has a glass transition temperature of 25° C. or less.

7. A solution in a slurry for a solid-state battery comprising sulfide-based solid electrolyte particles, the solution comprising a binder and a solvent, wherein the binder is the binder according to claim 1.

8. A slurry for a solid-state battery comprising sulfide-based solid electrolyte particles, a binder, and a solvent, wherein the binder is the binder according to claim 1.

9. The slurry for a solid-state battery according to claim 8, wherein the solvent is a low-polarity solvent.

10. The slurry for a solid-state battery according to claim 8, wherein the solvent contains at least one compound selected from the group consisting of aromatic compounds and ester compounds.

11. The slurry for a solid-state battery according to claim 8, further comprising active material particles.

12. The slurry for a solid-state battery according to claim 11, wherein the active material particles are a negative electrode active material.

13. An electrode for a solid-state battery comprising an electrode active material layer formed with the slurry according to claim 11, and a current collector.

14. The electrode for a solid-state battery according to claim 13, wherein the electrode is a negative electrode.

15. The electrode for a solid-state battery according to claim 14, wherein the electrode active material layer at least partially contains a carbonaceous material.

16. The electrode for a solid-state battery according to claim 14, wherein the electrode active material layer at least partially contains a silicon-containing compound.

17. A lithium-ion secondary solid-state battery comprising the electrode for a solid-state battery according to claim 13.

* * * * *